United States Patent
Chen et al.

(10) Patent No.: US 10,850,304 B2
(45) Date of Patent: Dec. 1, 2020

(54) METHOD AND DEVICE FOR PROCESSING MICROSTRUCTURE ARRAYS OF POLYSTYRENE-GRAPHENE NANOCOMPOSITES

(71) Applicant: Guangdong University of Technology, Guangdong (CN)

(72) Inventors: Yun Chen, Guangzhou (CN); Junyu Long, Guangzhou (CN); Shuang Zhou, Guangzhou (CN); Xin Chen, Guangzhou (CN); Jian Gao, Guangzhou (CN); Qiang Liu, Guangzhou (CN); Ching-Ping Wong, Guangdong (CN); Shenghui Zhang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 16/717,331

(22) Filed: Dec. 17, 2019

(65) Prior Publication Data

US 2020/0230644 A1    Jul. 23, 2020

Related U.S. Application Data

(63) Continuation of application No. PCT/CN2019/113344, filed on Oct. 25, 2019.

(30) Foreign Application Priority Data

Jan. 21, 2019    (CN) .......................... 2019 1 0054318

(51) Int. Cl.
*B05D 3/06*  (2006.01)
*B05D 1/00*  (2006.01)
(Continued)

(52) U.S. Cl.
CPC ............. *B05D 3/065* (2013.01); *B05D 1/005* (2013.01); *B05D 3/0493* (2013.01); *B23K 26/04* (2013.01);
(Continued)

(58) Field of Classification Search
CPC ....... B05D 3/065; B05D 3/0493; B05D 1/005
See application file for complete search history.

(56) References Cited

U.S. PATENT DOCUMENTS 10,427,936 B2 * 10/2019 Chen .................... B81C 1/00087
10,626,279 B2 *  4/2020 Kulkarni ................ B05D 3/065
2016/0340797 A1   11/2016 Ozyilmaz et al.

FOREIGN PATENT DOCUMENTS

CN    102344700 A     2/2012
CN    106057644 A    10/2016
(Continued)

OTHER PUBLICATIONS

Cui et al., A Micro-Pressure Sensing Method Based on the Micropatterned Electrodes Filled with the Microspheres, Materials 2017, 10, 1439, pp. 1-10. (Year: 2017).*
(Continued)

*Primary Examiner* — Atul P. Khare
(74) *Attorney, Agent, or Firm* — Wayne & Ken, LLC; Tony Hom

(57) ABSTRACT

A device for processing microstructure arrays of polystyrene-graphene nanocomposites, including a laser generator, a vacuum chamber, an object stage, an ultraviolet filter and a gas flow control unit. The object stage is detachably fixed to a bottom of the vacuum chamber with a passage that can be opened or closed. The ultraviolet filter is provided in the vacuum chamber. A laser light emitted by the laser generator arrives at the object stage through the ultraviolet filter. The object stage is configured to place a sample to be processed.
(Continued)

The gas flow control unit is communicated with the vacuum chamber and is configured to control the flow of the gas entering the vacuum chamber. The vacuum chamber is fixed on a three-axis precision positioning platform via a vacuum chamber clamp. The device disclosed herein aims to solve the existing difficulty in processing microstructure arrays of polystyrene-graphene nanocomposites.

1 Claim, 3 Drawing Sheets

(51) Int. Cl.
*B05D 3/04* (2006.01)
*B23K 26/04* (2014.01)
*B23K 26/359* (2014.01)
*B23K 26/08* (2014.01)
*B23K 26/12* (2014.01)
*B23K 26/352* (2014.01)
*B23K 26/06* (2014.01)

(52) U.S. Cl.
CPC ...... *B23K 26/0665* (2013.01); *B23K 26/0861* (2013.01); *B23K 26/123* (2013.01); *B23K 26/128* (2013.01); *B23K 26/352* (2015.10); *B23K 26/359* (2015.10)

(56) References Cited

FOREIGN PATENT DOCUMENTS

| | | |
|---|---|---|
| CN | 106220774 A | 12/2016 |
| CN | 106947956 A | 7/2017 |

OTHER PUBLICATIONS

Yu Xin, et al., Preparation and Thermal Conductivity of G/PS Composites [J]. China Plastics Industry, 2018, 46 (4): 156-159.

* cited by examiner

METHOD AND DEVICE FOR PROCESSING MICROSTRUCTURE ARRAYS OF POLYSTYRENE-GRAPHENE NANOCOMPOSITES

CROSS-REFERENCE TO RELATED APPLICATIONS

This application is a continuation of International Patent Application PCT/CN2019/113344, filed on Oct. 25, 2019, which claims the benefit of priority from Chinese Patent Application No. 201910054318.0, filed on Jan. 21, 2019. The content of the aforementioned application, including any intervening amendments thereto, is incorporated herein by reference in its entirety.

TECHNICAL FIELD

The present application relates to ultraviolet laser processing, and more particularly to a method and a device for processing microstructure arrays of polystyrene-graphene nanocomposites.

BACKGROUND OF THE INVENTION

Graphene has a variety of excellent and unique properties, such as large surface area, high charge carrier mobility, high thermal conductivity, high transmittance, excellent mechanical properties, as well as good chemical stability and biocompatibility. Such properties enable graphene to have broad application prospects in the fields such as microelectronics, energy storage, flexible displays, transparent conductive electrodes, composite materials and biomimetic equipment.

In order to take full advantage of the excellent properties of graphene, one of the most effective methods is to composite the graphene with substrate materials to prepare a composite material. Recently, a large number of researches have reported that the graphene and polymers are compounded to prepare high-performance conductive polymer substrate composites. However, graphene has a unique small size effect, surface effect and strong van der Waals forces, readily leading to the agglomeration and uneven distribution of graphene inside the polymer substrate. Moreover, the surface of graphene has strong hydrophobicity and chemical inertness, which leads to poor compatibility between the graphene and the polymer substrate and a significantly weakened interfacial bonding of the composite material. These problems not only limit the excellent performance of graphene, but also adversely impact the performance of the polymer substrates. Therefore, improving the interfacial bonding force between graphene and the polymer substrate is a bottleneck in the preparation of polymer/graphene nanocomposites with high performance.

Currently, graphene obtains better dispersibility mainly by improving the preparation technique and process of the composite material or by performing the functional modification for graphene. The existing methods mainly include solution intercalation, microsphere-covering reduction method, in situ emulsion polymerization, Pickering emulsion polymerization, "click" chemistry and ATRP method. However, these methods have complicated procedures and operations, resulting in low production efficiency, and the quality is difficult to be controlled. For example, in the paper "Preparation of thermal-conductive graphene/polystyrene composites" published in *China Plastics Industry* (Vol. 46, Issue 4), a graphene-coated polystyrene microsphere composite was synthesized by firstly synthesizing polystyrene (PS) microspheres with positive charges on the surface and a particle size of 600 nm using azobis(isobutylamidine hydrochloride) (AIBA) as an initiator and by adopting the dispersion polymerization method; and then coating the graphene oxide on the surface of PS microspheres using the self-assembly method and reducing the graphene oxide to graphene using the chemical reduction method. However, azobis(isobutylamidine hydrochloride) (AIBA) used therein was highly toxic, and the graphene cannot be directly coated on the PS microspheres, where reduction is required for the graphene oxide. Therefore, the synthesis method disclosed herein had a complicated process, low production efficiency and high cost. Chinese Patent Publication CN 102344700 A provided a method of preparing a graphene/polystyrene conductive composite material, including the following steps. Firstly, graphene oxide was prepared, and cationic polystyrene microspheres were prepared by dispersion polymerization, and then the graphene oxide and PS microspheres were mixed to obtain a mixture, and finally hydrazine hydrate was added to the mixture for reduction. The graphene polystyrene composite prepared herein had a weak interfacial bonding, and graphene was unevenly distributed on the surface of the polystyrene substrate. Chinese Patent Publication CN 106220774 A disclosed a method for preparing polystyrene-graphene nanocomposites to solve the problems of residual solvent and uneven dispersion. In the method, a liquid dimethylamine (DMA) used as a dispersing auxiliary was mixed with graphene nanosheet powders, and then the mixture was subjected to ultrasonic treatment to produce graphene nanosheet dispersant. The other processing steps were similar to the steps in Chinese Patent Publication CN 102344700 A. In the above two Chinese Patent Applications, hydrazine hydrate which was highly toxic was used to reduce graphene oxide to obtain graphene coated on polystyrene microspheres, and graphene required a plurality of procedures for the oxidation and reduction during the whole processes, resulting in low production efficiency, long reaction time and high cost.

In summary, there is an urgent need to develop an efficient and low-cost method and a device for processing microstructure arrays of polystyrene-graphene nanocomposites.

SUMMARY OF THE INVENTION

In view of the above shortcomings, an object of the invention is to provide a device for processing microstructure arrays of polystyrene-graphene nanocomposites.

The device for processing the microstructure arrays of the polystyrene-graphene nanocomposites, including a laser generator, a vacuum chamber, an object stage, an ultraviolet filter and a gas flow control unit.

The object stage is detachably fixed to a bottom of the vacuum chamber, and the vacuum chamber is provided with a passage that can be opened or closed.

The ultraviolet filter is provided in the vacuum chamber. A laser light emitted by the laser generator arrives at the object stage located in the vacuum chamber through the ultraviolet filter. The object stage is configured to place a sample to be processed.

The gas flow control unit is communicated with the vacuum chamber and is configured to control the flow of the gas entering the vacuum chamber.

The vacuum chamber is fixed on a three-axis precision positioning platform via a vacuum chamber clamp.

In some embodiments, the gas flow control unit includes a gas flow meter and a flow controller.

One end of the flow controller is connected to the vacuum chamber, and the other end of the flow controller is connected to a gas source. The gas flow meter is communicated to a pipeline between the flow controller and the gas source.

The device for processing the microstructure arrays of the polystyrene-graphene nanocomposites further includes a vacuum gauge and a vacuum pump. The vacuum gauge is communicated with the vacuum chamber. The vacuum pump is connected to the vacuum chamber via a connecting pipe to discharge gas in the vacuum chamber.

In some embodiments, the connecting pipe is a vacuum bellows made of 304 stainless steel KF16.

In some embodiments, the gas flow meter has a maximum measurement range of 300 mL/min, and the vacuum pump can achieve the vacuum degree of the vacuum chamber to 0.1 KPa or more.

Another object of this invention is to provide a method for processing the microstructure arrays of the polystyrene-graphene nanocomposites, comprising:

(1) mixing polystyrene microsphere powders and absolute ethanol at a ratio of 1:1 to obtain a mixture, and then stirring the mixture by a magnetic stirrer for 10 min to uniformly disperse the polystyrene microsphere powders in the absolute ethanol to obtain a polystyrene microsphere ethanol solution;

(2) placing a silicon wafer with a size of 2 cm×2 cm on a workbench of a spin coater, and dropwise adding the polystyrene microsphere ethanol solution obtained in step (1) on the silicon wafer by a pipettor, wherein low and high rotation speeds are respectively set to 400 rpm and 1000 rpm, and a spin-coating time is 50 seconds, so that the polystyrene microsphere ethanol solution is uniformly coated on the silicon wafer;

(3) drying the silicon wafer coated with the polystyrene microsphere ethanol solution obtained in step (2) in a vacuum drying oven at a vacuum degree of 0.1 KPa at 60° C. for 1 h to obtain a sample, wherein an ethanol solution in the polystyrene microsphere ethanol solution volatilizes, and polystyrene microspheres form a compact monolayer structure;

(4) placing the sample dried in step (3) on an object stage in a vacuum chamber of a laser processing system, and locking the vacuum chamber to prevent outside gases from entering the vacuum chamber;

(5) controlling a movement of a three-axis precision positioning platform by a computer software control interface to enable a position to be processed of the sample directly to locate below a laser generator, wherein an ultraviolet filter is located directly below the laser generator, and only ultraviolet light can pass through the ultraviolet filter, but light of other wavelengths is blocked, so that the sample is not damaged by the light of other wavelengths during processing;

(6) switching on a vacuum pump to reduce a vacuum degree of the vacuum chamber to 0.1 KPa, and keeping the vacuum pump operating for more than 1 min, so that an oxygen content in the vacuum chamber is minimized to avoid burning of the sample when the sample is heated during the processing;

(7) introducing a shielding gas at a flow rate of 300 mL/min, and keeping the vacuum pump operating for more than 3 min; and continuously introducing the shielding gas for 3 min, wherein the shielding gas is introduced to remove a residual oxygen in the vacuum chamber, so that free carbon and graphene generated during processing are not be oxidized, and the sample does not burn when the sample is heated during the processing;

(8) turning off the vacuum pump, and introducing the shielding gas until the vacuum degree of the vacuum chamber is 100 KPa; wherein the shielding gas is shut off and the vacuum chamber is filled with the shielding gas to further dilute the residual oxygen in the vacuum chamber, thereby forming a shielding gas atmosphere in the vacuum chamber with a certain pressure, and preventing movements and damages of the sample due to sudden influx of external air;

(9) repeating the procedures of the air removal and the shielding gas intake three times to remove a residual gas in the vacuum chamber, thereby preventing an adverse impact of other gas on the laser processing;

(10) turning on the vacuum pump and introducing the shielding gas; controlling a flow rate of the shielding gas to be 300 mL/min and the vacuum degree of the vacuum chamber at 0.1 KPa; maintaining a stable shielding gas atmosphere in the vacuum chamber until the processing is finished;

(11) processing a pattern by using a laser to draw lines on the sample, wherein a spacing between the lines in the pattern is 0.03-0.05 mm;

(12) adjusting parameters of the laser generator, and adjusting a location of a laser focus to make a distance between the position to be processed and the laser focus appropriate, and then starting the processing according to a predesigned pattern, wherein the distance between the position to be processed and the laser focus is required to be appropriate, because that high energy damages the sample when the distance is so close, and low energy fails to convert a surface of the polystyrene microspheres into graphene when the distance is so far; and

(13) controlling the three-axis precision positioning platform to a discharging point after the processing is completed, and opening the vacuum chamber to take out a finished product, wherein a surface of the finished product has microstructure arrays of the graphene/polystyrene microsphere composites.

The beneficial effects of this invention are described as follows.

1. The polystyrene microspheres are efficiently processed by the laser to realize surface reconstruction, so as to generate graphene. Therefore, the laser generator and the vacuum chamber are utilized in this invention. Moreover, in order to form various patterns on a surface of a sample to be processed and form various microstructure arrays, the vacuum chamber of this invention is fixed on the three-axis precision positioning platform, so that the vacuum chamber and the object fixed in the vacuum chamber can precisely positioned along the movement of the three-axis precision positioning platform; and 2. The gas flow control unit is configured to accurately control the amount of the gas entering the vacuum chamber, and the vacuum pump and the vacuum gauge are configured to precisely control a vacuum degree in the vacuum chamber, thereby improving product quality and yield.

Figure 1:
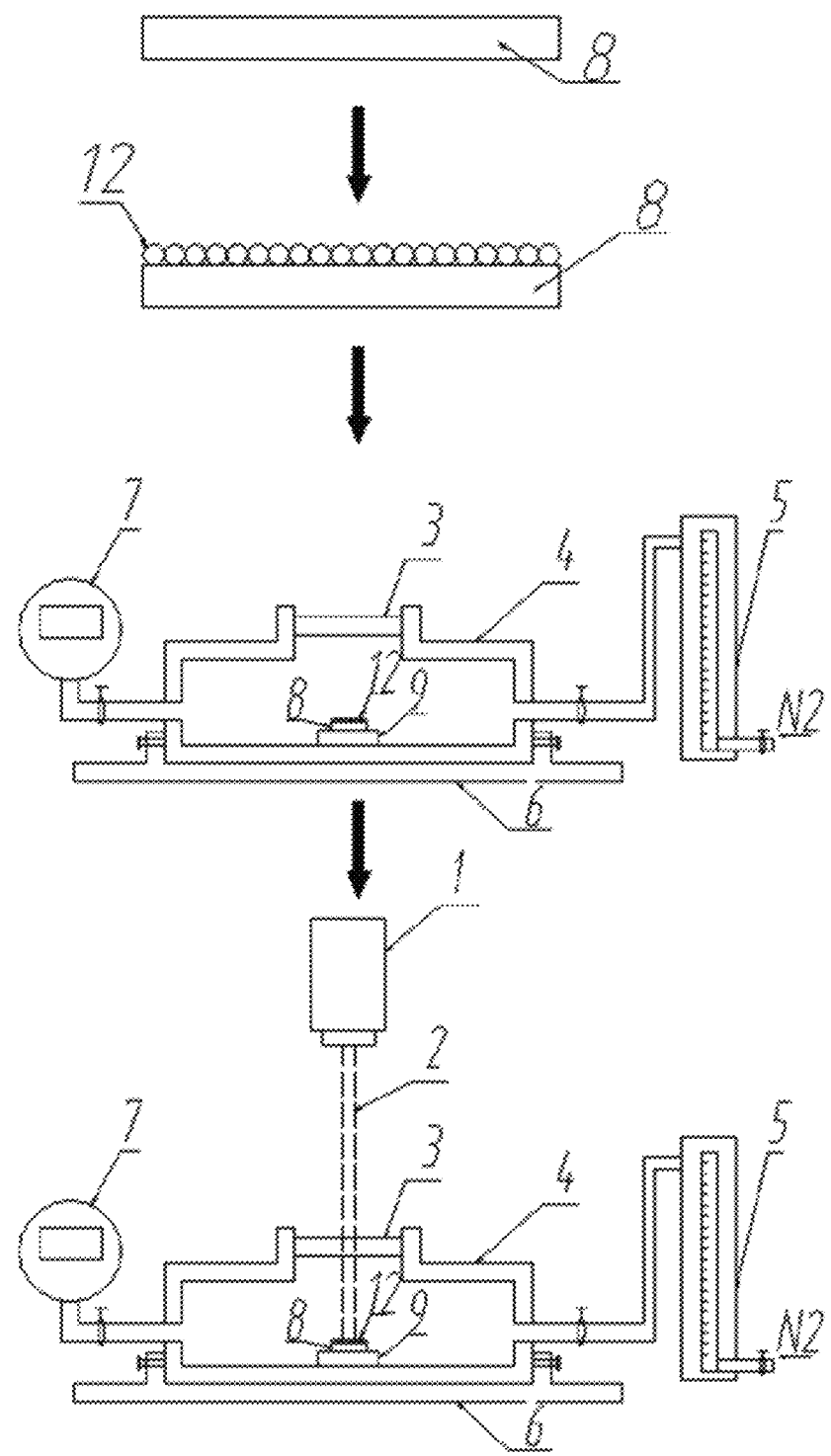
FIG. 1 schematically shows a processing flow of microstructure arrays of polystyrene-graphene nanocomposites according to an embodiment of the invention.

Reference numerals: 1—laser generator; 2—incident laser beam; 3—ultraviolet filter; 4—vacuum chamber; 5—gas flow control unit; 6—vacuum chamber clamp; 7—vacuum gauge; 8—silicon wafer coated with polystyrene microspheres; 9—object stage; 10—three-axis precision positioning platform; 11—vacuum pump; 12—polystyrene microspheres; and 14—graphene/polystyrene microsphere composite.

DETAILED DESCRIPTION OF EMBODIMENTS

The technical solutions of this invention will be further described below with reference to the accompanying drawings and specific embodiments.

Figure 2:
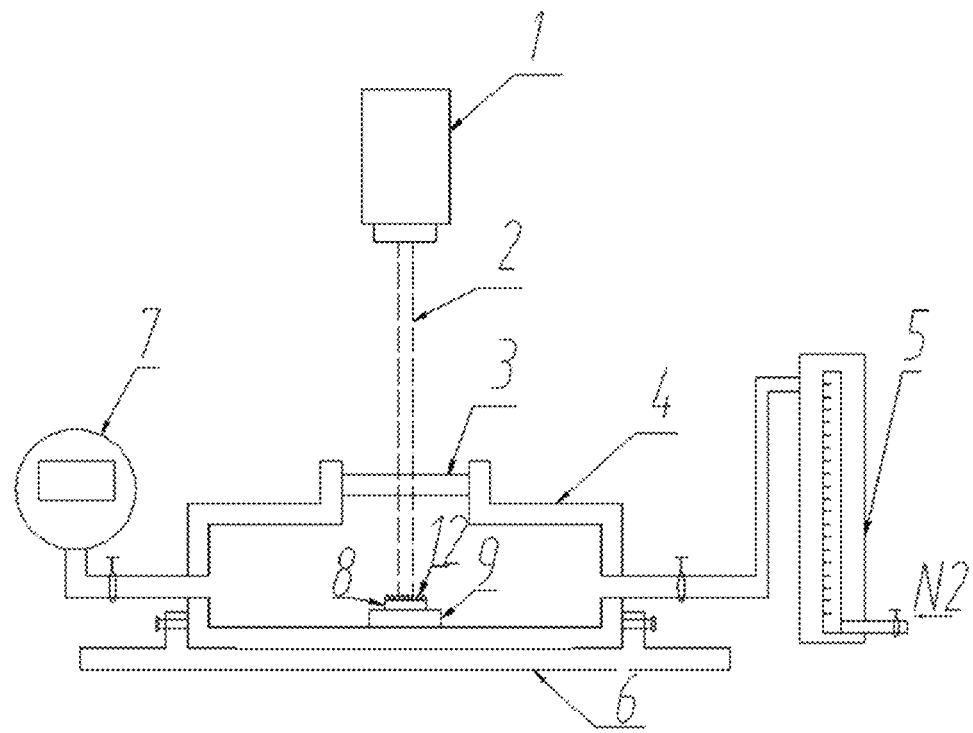
FIG. 2 is a schematic view of a device for processing the microstructure arrays of the polystyrene-graphene nanocomposites according to an embodiment of the invention.
Figure 3:
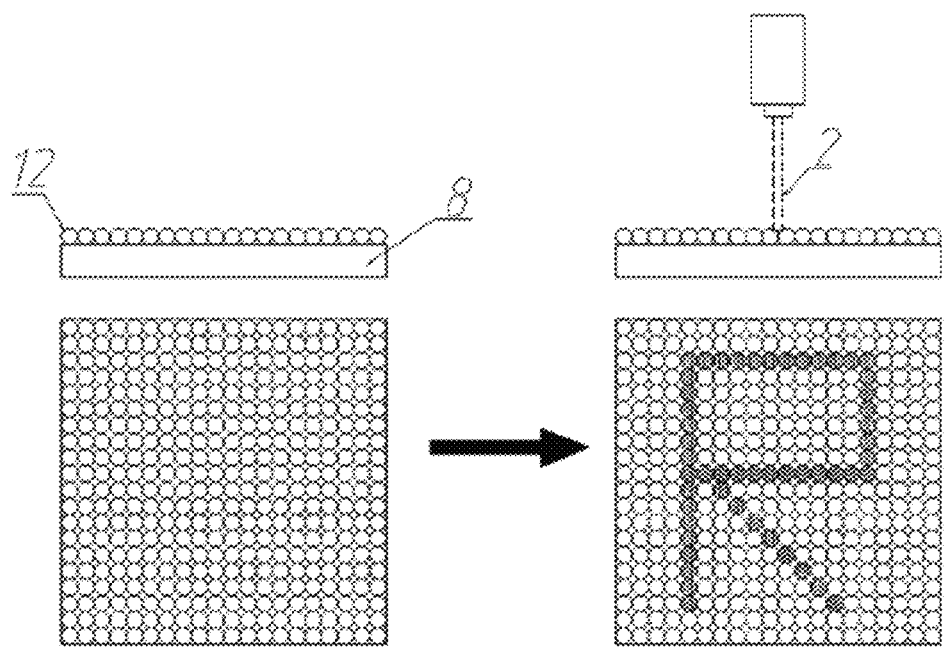
FIG. 3 is a schematic view of a nanoscale pattern processed by a laser according to an embodiment of the invention.
Figure 4:
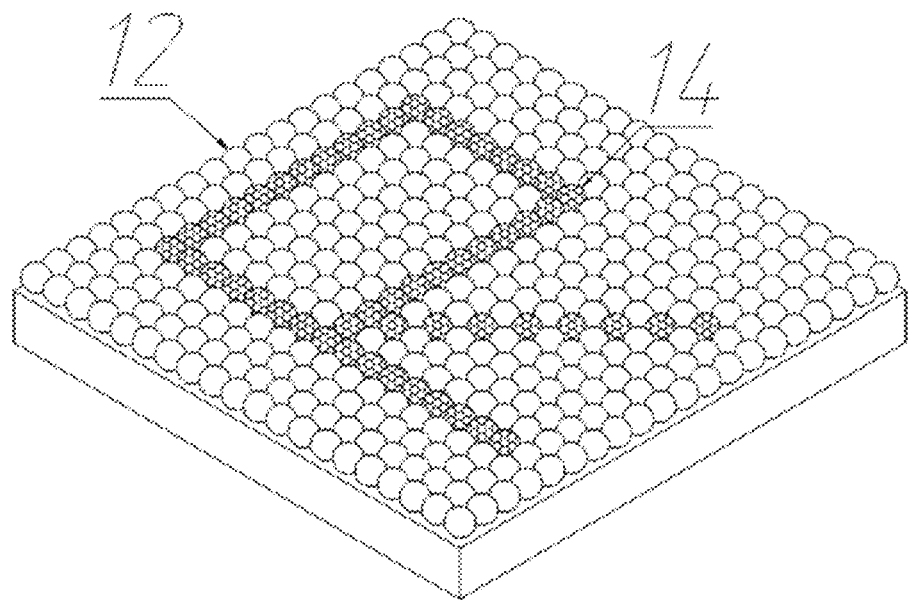
FIG. 4 schematically shows graphene converted from a surface of polystyrene according to an embodiment of the invention.
Figure 5:
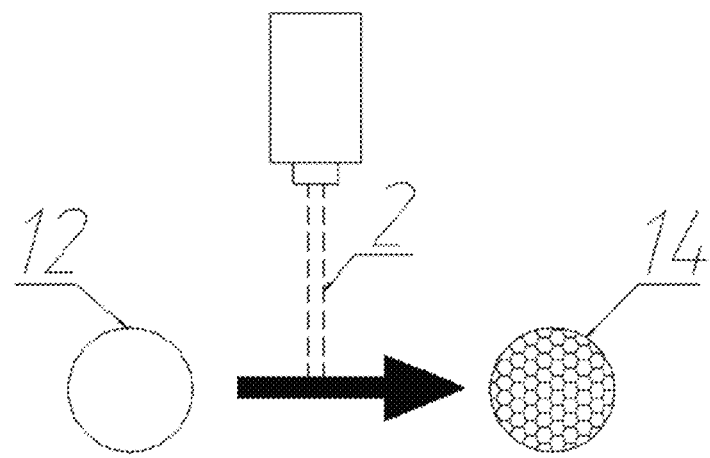
FIG. 5 is a simplified diagram of the device for processing the microstructure arrays of the polystyrene-graphene nanocomposites according to an embodiment of the invention.

FIGS. 1-5 schematically show a device for processing microstructure arrays of polystyrene-graphene nanocomposites, including: a laser generator 1, a vacuum chamber 4, an object stage 9, an ultraviolet filter 3 and a gas flow control unit 5.

The object stage is detachably fixed to a bottom of the vacuum chamber 4, and the vacuum chamber 4 has a passage that can be opened or closed.

The ultraviolet filter 3 is provided in the vacuum chamber 4. A laser light emitted by the laser generator 1 arrives at the object stage through the ultraviolet filter 3. The object stage is configured to place a sample to be processed.

The gas flow control unit 5 is communicated with the vacuum chamber 4 and is configured to control the flow of the gas entering the vacuum chamber 4.

The vacuum chamber 4 is fixed on the three-axis precision positioning platform 10 via a vacuum chamber clamp 6.

The polystyrene microspheres 12 are efficiently processed by the laser to realize surface reconstruction, so as to generate graphene. That's why the laser generator 1 and the vacuum chamber 4 are utilized in this embodiment. Moreover, in order to process various patterns on a surface of the sample and form various microstructure arrays, the vacuum chamber 4 is fixed on the three-axis precision positioning platform 10, so that the vacuum chamber 4 and an object fixed in the vacuum chamber 4 can be precisely positioned along the movement of the three-axis precision positioning platform 10.

In this embodiment, the gas flow control unit 5 includes a gas flow meter and a flow controller.

One end of the flow controller is connected to the vacuum chamber 4, and the other end of the flow controller is connected to a gas source. The gas flow meter is communicated to a pipeline between the flow controller and the gas source.

A device for processing the microstructure arrays of the polystyrene-graphene nanocomposites of this invention further includes a vacuum gauge 7 and a vacuum pump 11. The vacuum gauge 7 is communicated with the vacuum chamber 4. The vacuum pump 11 is connected to an interface of the vacuum chamber 4 via a connecting pipe to discharge gases in the vacuum chamber.

In this embodiment, the gas flow control unit is configured to accurately control the amount of the gas entering the vacuum chamber, and the vacuum pump 11 and the vacuum gauge 7 are configured to precisely control a vacuum degree of the vacuum chamber, thereby improving product quality and yield.

In some embodiments, the connecting pipe is a vacuum bellows made of 304 stainless steel KF16.

The vacuum bellows readily bends without deformation, benefits the efficiency in building a vacuum environment and has ease in the installation and dismantling.

In addition, the gas flow meter has a maximum measurement range of 300 mL/min, and the vacuum pump can achieve the vacuum degree of the vacuum chamber 4 to 0.1 KPa or more.

A method for processing the microstructure arrays of the polystyrene-graphene nanocomposites provided herein has the following steps.

(1) Polystyrene microsphere powders and absolute ethanol were mixed at a ratio of 1:1 to obtain a mixture, and then the mixture was stirred by a magnetic stirrer for 10 min to prepare a polystyrene microsphere ethanol solution.

(2) A silicon wafer with a size of 2 cm×2 cm was placed on a workbench of a spin coater, and the polystyrene microsphere solution obtained in step (1) was dropwise added on the silicon wafer by a pipettor, where low and high rotation speeds were respectively set to 400 rpm and 1000 rpm, and a spin-coating time was 50 seconds.

(3) The silicon wafer coated with the polystyrene microsphere ethanol solution obtained in step (2) was dried in a vacuum drying oven at a vacuum degree of 0.1 KPa at 60° C. for 1 h to obtain a sample.

(4) The sample dried in step (3) was placed on an object stage in a vacuum chamber of a laser processing system and then the vacuum chamber was locked.

(5) A movement of a three-axis precision positioning platform was controlled by a computer software control interface to enable a position to be processed of the sample to locate directly below a laser generator, where an ultraviolet filter was located directly below the laser generator.

(6) A vacuum pump was switched on to reduce a vacuum degree of the vacuum chamber to 0.1 KPa, and the vacuum pump was kept operating for more than 1 min.

(7) A shielding gas was introduced at a flow rate of 300 mL/min, and the vacuum pump was kept operating for more than 3 min; and the shielding gas was continuously introduced for 3 min, where the shielding gas was introduced to remove a residual oxygen and the like in the vacuum chamber, so that free carbon and graphene generated during processing are not be oxidized.

(8) The vacuum pump was turned off, and the shielding gas was continuously introduced until the vacuum degree of the vacuum chamber was 100 KPa, after that, the shielding gas was shut off and the vacuum chamber 4 was filled with the shielding gas to further dilute the residual oxygen in the vacuum chamber 4.

(9) The procedures of the gas removal and the shielding gas intake were repeated three times to remove a residual gas in the vacuum chamber, preventing an adverse impact of the residual gas on the processing.

(10) The vacuum pump was turned on and the shielding gas was introduced, and a flow rate of the shielding gas was controlled to be 300 mL/min, simultaneously, the vacuum degree of the vacuum chamber was maintained at 0.1 KPa until the processing was finished.

(11) A pattern was processed by using a laser to draw lines on the sample, where a spacing between the lines in the pattern was 0.03-0.05 mm.

(12) The parameters of the laser generator 1 were set to have the number of markings of 1, a marking speed of 100 mm/s, the number of separators of 1, a power percentage of 40%, a calibration power of 1.8 W; and then a distance from a laser focus to a surface of silicon wafer coated with polystyrene microspheres 8 was adjusted to a range of 3-5 mm; the laser generator 1 was switched on for processing.

(13) After the processing was completed, the three-axis precision positioning platform 10 arrived at a discharging point, and a finished product could be took out from the vacuum chamber 4, where microstructure arrays of the graphene/polystyrene microsphere composites were obtained on a surface of the finished product.

The polystyrene microspheres were efficiently processed by the laser to realize surface reconstruction, so as to generate graphene. The graphene generated herein was firmly attached to surfaces of the polystyrene microspheres, thereby greatly improving the composites in the bonding strength of polystyrene and graphene. The various patterns could be quickly processed by the laser to form various microstructure arrays. This processing method has a simple and rapid operation with high processing efficiency, having great application prospects.

The technical principles of the invention are described above with reference to specific embodiments. These descriptions are merely illustration of the principles and not intended to limit the scope of the invention. All other embodiments made by those skilled in the art based on the explanation disclosed herein without sparing any creative efforts, should fall within the scope of the invention.

What is claimed is:

1. A method for processing microstructure arrays of polystyrene-graphene nanocomposites, the method comprising:

(1) mixing polystyrene microsphere powders and absolute ethanol at a ratio of 1:1 to obtain a mixture, and then stirring the mixture by a magnetic stirrer for 10 min so as to uniformly disperse the polystyrene microsphere powders in the absolute ethanol to obtain a polystyrene microsphere ethanol solution;

(2) placing a silicon wafer with a size of 2 cm×2 cm on a workbench of a spin coater, dropwise adding the polystyrene microsphere ethanol solution obtained in step (1) on the silicon wafer by a pipettor, and spin coating the solution, wherein low and high rotation speeds of the spin coater are respectively set to 400 rpm and 1000 rpm and a spin-coating time is 50 seconds so that the polystyrene microsphere ethanol solution is uniformly coated on the silicon wafer;

(3) drying the silicon wafer coated with the polystyrene microsphere ethanol solution obtained in step (2) in a vacuum drying oven at a vacuum degree of 0.1 KPa at 60° C. for 1 h to obtain a sample, wherein an ethanol solution in the polystyrene microsphere ethanol solution volatilizes by said drying and polystyrene microspheres thereof form a compact monolayer structure;

(4) placing the sample dried in step (3) on an object stage in a vacuum chamber of a laser processing system, and locking the vacuum chamber to prevent outside gases from entering the vacuum chamber, the vacuum chamber being arranged on a three-axis precision positioning platform;

(5) controlling a movement of the three-axis precision positioning platform by a computer software control interface so as to position the sample below a laser generator, wherein an ultraviolet filter is located directly below the laser generator, and only ultraviolet light can pass through the ultraviolet filter, but light of other wavelengths is blocked, so that the sample is not damaged by the light of other wavelengths during laser processing;

(6) switching on a vacuum pump to reduce a pressure of the vacuum chamber to 0.1 KPa, and keeping the vacuum pump operating for more than 1 min, so that an oxygen content in the vacuum chamber is minimized to avoid burning of the sample when the sample is heated during the processing;

(7) introducing a shielding gas at a flow rate of 300 mL/min for 3 min while keeping the vacuum pump operating for more than 3 min, wherein the shielding gas is introduced to remove residual oxygen in the vacuum chamber so that free carbon and graphene generated during the processing are not oxidized and the sample does not burn when the sample is heated during the processing;

(8) turning off the vacuum pump, continuing to introduce the shielding gas until the pressure of the vacuum chamber is 100 KPa, and then shutting off the shielding gas so that the vacuum chamber is filled with the shielding gas to further dilute the residual oxygen in the vacuum chamber, thereby forming a shielding gas atmosphere in the vacuum chamber with a certain pressure preventing movements and damage of the sample due to sudden influx of external air;

(9) repeating steps (6)-(8) three times to remove a residual gas in the vacuum chamber, thereby preventing an adverse impact of the residual gas on the processing;

(10) turning on the vacuum pump and introducing the shielding gas, controlling a flow rate of the shielding gas to be 300 mL/min and the pressure of the vacuum chamber at 0.1 KPa, and maintaining a stable shielding gas atmosphere in the vacuum chamber until the processing is finished;

(11) performing the processing to form a pattern by using a laser drawing lines on the sample, wherein a spacing between the lines in the pattern is 0.03-0.05 mm;

(12) during said processing, adjusting parameters of the laser generator and adjusting a location of a laser focus to make a distance between the position of the sample being processed and the laser focus appropriate, and continuing the processing according to a predesigned pattern, wherein the distance is set so as not to be so close that high energy damages occur in the sample and is set so as not to be so far as to fail to convert a surface of the polystyrene microspheres into graphene by said processing; and

(13) controlling the three-axis precision positioning platform to a discharging point after said finishing of the processing and opening the vacuum chamber to take out a finished product, wherein a surface of the finished product has microstructure arrays of the graphene/polystyrene microsphere composites formed by said processing.

* * * * *